US012578766B2

(12) United States Patent
Hillyerd et al.

(10) Patent No.: US 12,578,766 B2
(45) Date of Patent: Mar. 17, 2026

(54) HINGE WITH TRANSLATABLE AXIS

(71) Applicant: Microsoft Technology Licensing, LLC, Redmond, WA (US)

(72) Inventors: Anthony E. Hillyerd, Sammamish, WA (US); Christina Ashley Yee, Redmond, WA (US); Aseem Singla, Redmond, WA (US); Robyn Rebecca Reed McLaughlin, Seattle, WA (US); Kaitlyn Marley Schoeck, Seattle, WA (US); Hua Wang, Redmond, WA (US); Daniel Dhondt, Redmond, WA (US); Brian David Bitz, Woodinville, WA (US); Joseph Benjamin Gault, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 17/790,926

(22) PCT Filed: Jun. 28, 2020

(86) PCT No.: PCT/US2020/040031
§ 371 (c)(1),
(2) Date: Jul. 5, 2022

(87) PCT Pub. No.: WO2021/141626
PCT Pub. Date: Jul. 15, 2021

(65) Prior Publication Data
US 2023/0034612 A1 Feb. 2, 2023

Related U.S. Application Data

(60) Provisional application No. 62/957,641, filed on Jan. 6, 2020.

(51) Int. Cl.
*G06F 1/18* (2006.01)
*G06F 1/16* (2006.01)
(Continued)

(52) U.S. Cl.
CPC .......... *G06F 1/1681* (2013.01); *G06F 1/1618* (2013.01); *G06F 1/162* (2013.01);
(Continued)

(58) Field of Classification Search
CPC ...... G06F 1/1616; G06F 1/1618; G06F 1/162; G06F 1/1681; E05D 3/18; H04M 1/0216; H04M 1/022
See application file for complete search history.

(56) References Cited

U.S. PATENT DOCUMENTS 5,489,924 A 2/1996 Shima
5,564,163 A 10/1996 Lowry et al.
(Continued)

FOREIGN PATENT DOCUMENTS

CN 201301889 Y 9/2009
CN 101672322 A 3/2010
(Continued)

OTHER PUBLICATIONS

"International Search Report and Written Opinion Issued in PCT Application No. PCT/US20/014025", Mailed Date: Oct. 9, 2020, 14 Pages.
(Continued)

*Primary Examiner* — Nidhi Thaker
(74) *Attorney, Agent, or Firm* — Ray Quinney & Nebeker P.C.; John O. Carpenter

(57) ABSTRACT
A hinge system has a first body and a second body rotatably connected to one another around a first pivot point. The second body has a top surface and bottom surface positioned opposite one another in a vertical direction of the second
(Continued)

body. A translation mechanism is connected to the second body and the first pivot point to displace the first pivot point in the vertical direction relative to the second body.

10 Claims, 9 Drawing Sheets

(51) Int. Cl.
| | | |
|---|---|---|
| *H04M 1/02* | (2006.01) | |
| *E05D 3/12* | (2006.01) | |
| *E05D 3/18* | (2006.01) | |

(52) U.S. Cl.
CPC ............. *H04M 1/022* (2013.01); *E05D 3/122* (2013.01); *E05D 3/18* (2013.01); *E05Y 2999/00* (2024.05); *G06F 1/1616* (2013.01); *H04M 1/0216* (2013.01)

(56) References Cited

U.S. PATENT DOCUMENTS

| | | | | |
|---|---|---|---|---|
| 5,644,469 | A | 7/1997 | Shioya | |
| 6,266,236 | B1 | 7/2001 | Ku et al. | |
| 6,464,195 | B1 | 10/2002 | Hildebrandt | |
| 6,826,043 | B2 | 11/2004 | Chang | |
| 7,061,753 | B2 | 6/2006 | Michoux | |
| 7,403,378 | B2 | 7/2008 | Lo et al. | |
| 7,478,786 | B2 | 1/2009 | Copeland | |
| 7,742,285 | B2 | 6/2010 | Ishikura | |
| 8,074,323 | B2 | 12/2011 | Lin | |
| 8,253,648 | B2 | 8/2012 | Nagai | |
| 8,908,364 | B2 | 12/2014 | Tseng et al. | |
| 8,914,946 | B2 | 12/2014 | Hsu et al. | |
| 9,107,301 | B2 * | 8/2015 | Pan | G06F 1/1618 |
| 9,261,906 | B2 | 2/2016 | Arima | |
| 9,291,299 | B2 | 3/2016 | Richard | |
| 9,405,325 | B2 * | 8/2016 | Kim | G06F 1/1624 |
| 9,523,226 | B1 | 12/2016 | Lam et al. | |
| 9,557,778 | B2 * | 1/2017 | Sung | G06F 1/1632 |
| 9,644,412 | B2 | 5/2017 | Novin | |
| 9,791,674 | B1 | 10/2017 | Topliss | |
| 9,927,844 | B2 | 3/2018 | Park | |
| 10,025,348 | B2 | 7/2018 | Arima | |
| 10,061,360 | B1 * | 8/2018 | Magi | G06F 1/1681 |
| 10,151,128 | B2 | 12/2018 | Hatano | |
| 10,324,501 | B1 | 6/2019 | Zimmerman et al. | |
| 10,407,957 | B1 | 9/2019 | Camp et al. | |
| 10,474,203 | B2 * | 11/2019 | Tazbaz | G06F 1/1681 |
| 10,558,245 | B2 | 2/2020 | Morrison et al. | |
| 10,648,212 | B2 | 5/2020 | Novin | |
| 10,761,571 | B1 | 9/2020 | Cooper | |
| 10,852,765 | B2 | 12/2020 | Sanchez | |
| 10,996,710 | B2 | 5/2021 | Park | |
| 11,008,789 | B2 | 5/2021 | Hatano | |
| 11,106,249 | B1 | 8/2021 | Zimmerman | |
| 11,237,643 | B2 | 2/2022 | Kulkarni | |
| 11,507,145 | B2 | 11/2022 | Nakamura | |
| 11,573,611 | B2 * | 2/2023 | Channaiah | E05D 11/105 |
| 2004/0021051 | A1 | 2/2004 | Chiu | |
| 2005/0138775 | A1 * | 6/2005 | Oakley | G06F 1/1681 |
| | | | | 16/368 |
| 2006/0211457 | A1 | 9/2006 | Otsuka | |
| 2006/0288258 | A1 * | 12/2006 | Lo | G06F 1/162 |
| | | | | 714/46 |
| 2007/0058329 | A1 | 3/2007 | Ledbetter | |
| 2007/0183123 | A1 * | 8/2007 | Chuan | H04M 1/022 |
| | | | | 361/679.02 |
| 2008/0094792 | A1 * | 4/2008 | Chen | G06F 1/1683 |
| | | | | 29/748 |
| 2008/0271288 | A1 * | 11/2008 | Senatori | G06F 1/1616 |
| | | | | 16/221 |
| 2011/0312392 | A1 * | 12/2011 | Reeves | H04M 1/0216 |
| | | | | 455/575.3 |
| 2012/0124775 | A1 | 5/2012 | Ceci | |

| | | | | |
|---|---|---|---|---|
| 2013/0160244 | A1 * | 6/2013 | Sayama | G06F 1/1681 |
| | | | | 16/370 |
| 2013/0318746 | A1 | 12/2013 | Kuramochi | |
| 2014/0157546 | A1 * | 6/2014 | Ho | E05D 7/00 |
| | | | | 16/221 |
| 2014/0165334 | A1 | 6/2014 | Liu | |
| 2014/0338483 | A1 | 11/2014 | Hsu et al. | |
| 2014/0375194 | A1 | 12/2014 | Arima | |
| 2014/0375196 | A1 | 12/2014 | Nguyen | |
| 2015/0002998 | A1 | 1/2015 | Arima | |
| 2015/0077915 | A1 | 3/2015 | Saito | |
| 2015/0121654 | A1 | 5/2015 | Novin | |
| 2015/0185786 | A1 | 7/2015 | Yeh et al. | |
| 2016/0147267 | A1 | 5/2016 | Bitz et al. | |
| 2016/0327994 | A1 | 11/2016 | Lee | |
| 2017/0097657 | A1 | 4/2017 | Hampton et al. | |
| 2017/0208703 | A1 * | 7/2017 | Lin | E05D 5/02 |
| 2017/0218672 | A1 | 8/2017 | Novin | |
| 2018/0044958 | A1 | 2/2018 | Tazbaz et al. | |
| 2018/0059735 | A1 * | 3/2018 | Tazbaz | G06F 1/1677 |
| 2018/0066465 | A1 * | 3/2018 | Tazbaz | G06F 1/1681 |
| 2018/0088634 | A1 | 3/2018 | Bitz | |
| 2018/0112447 | A1 | 4/2018 | Hatano | |
| 2018/0188781 | A1 * | 7/2018 | Park, Jr. | G06F 1/1679 |
| 2018/0209473 | A1 * | 7/2018 | Park | G06F 1/1618 |
| 2019/0011957 | A1 | 1/2019 | Wendt | |
| 2019/0029135 | A1 | 1/2019 | Park et al. | |
| 2019/0064886 | A1 * | 2/2019 | Wendt | G06F 1/1679 |
| 2019/0243426 | A1 | 8/2019 | Morrison et al. | |
| 2020/0040626 | A1 | 2/2020 | Hatano | |
| 2020/0233459 | A1 | 7/2020 | Sanchez | |
| 2021/0289644 | A1 | 9/2021 | Zarnowitz | |
| 2022/0057844 | A1 | 2/2022 | Nakamura | |
| 2023/0049295 | A1 | 2/2023 | Hillyerd | |
| 2023/0049811 | A1 | 2/2023 | Krahn | |
| 2023/0084038 | A1 | 3/2023 | Yee et al. | |
| 2023/0123520 | A1 * | 4/2023 | Yee | G06F 1/162 |
| | | | | 361/679.27 |
| 2023/0129909 | A1 | 4/2023 | Yee et al. | |
| 2024/0111330 | A1 | 4/2024 | Yu | |
| 2024/0111339 | A1 | 4/2024 | Sun | |

FOREIGN PATENT DOCUMENTS

| | | | |
|---|---|---|---|
| CN | 102572029 | A | 7/2012 |
| CN | 103291163 | A | 9/2013 |
| CN | 103576772 | A | 2/2014 |
| CN | 104765412 | A | 7/2015 |
| CN | 104767843 | A | 7/2015 |
| CN | 204553526 | U | 8/2015 |
| CN | 107771308 | A | 3/2018 |
| CN | 109564449 | A | 4/2019 |
| CN | 109643144 | A | 4/2019 |
| CN | 110168470 | A | 8/2019 |
| CN | 110226149 | A | 9/2019 |
| CN | 108691470 | A | 9/2021 |
| EP | 2397929 | A1 | 12/2011 |
| EP | 2557473 | A1 | 2/2013 |
| EP | 2615331 | A1 | 7/2013 |
| EP | 2696255 | A2 | 2/2014 |
| EP | 2911030 | A2 | 8/2015 |
| EP | 3069208 | A1 | 9/2016 |
| GB | 931284 | A | 7/1963 |
| WO | 2010015931 | A2 | 2/2010 |

OTHER PUBLICATIONS

"International Search Report and Written Opinion Issued in PCT Application No. PCT/US20/024692", Mailed Date: Dec. 11, 2020, 15 Pages.
"International Search Report and Written Opinion Issued in PCT Application No. PCT/US20/024700", Mailed Date: Nov. 23, 2020, 12 Pages.
"International Search Report and Written Opinion Issued in PCT Application No. PCT/US20/040030", Mailed Date: Oct. 9, 2020, 13 Pages.

(56)          References Cited

OTHER PUBLICATIONS

"International Search Report and Written Opinion Issued in PCT Application No. PCT/US20/040031", Mailed Date: Dec. 2, 2020, 17 Pages.
"Invitation to Pay Additional Fees Issued in PCT Application No. PCT/US20/040031", Mailed Date: Oct. 7, 2020, 10 Pages.
Communication pursuant to Article 94(3) EPC, Received for European Application No. 20720607.9, mailed on Jul. 5, 2024, 8 pages.
Communication under Rule 71(3) received in European Application No. 20719884.7, mailed on Jun. 18, 2024, 8 pages.
Second Office Action Received for Chinese Application No. 202080092255.9, mailed on May 23, 2024, 11 pages. (English Translation Provided).
Office Action Received for Chinese Application No. 202080092254.4, mailed on Dec. 11, 2023, 11 pages (English Translation Provided).
Office Action received for Chinese Application No. 202080092255.9, mailed on Dec. 1, 2023, 16 Pages (English Translation Provided).
Office Action Received for Chinese Application No. 202080093593.4, mailed on Dec. 28, 2023, 11 pages.
First Office Action Received for Chinese Application No. 202080099087.6, mailed on Aug. 17, 2024, 17 pages (English Translation Provided).
Non-Final Office Action mailed on Sep. 28, 2024, in U.S. Appl. No. 17/790,914, 09 pages.
Non-Final Office Action mailed on Aug. 28, 2024, in U.S. Appl. No. 17/793,624, 12 pages.
Office Action Received for Chinese Application No. 202080092254.4, mailed on Aug. 29, 2024, 9 pages. (English Translation Provided).
Office Action Received for Chinese Application No. 202080099092.7, mailed on Nov. 21, 2024, 15 Pages (English Translation Provided).
Communication pursuant to Article 94(3) Received in European Patent Application No. 20743461.4, mailed on Jan. 16, 2025, 8 pages.
Decision on Rejection Received for Chinese Application No. 202080092255.9, mailed on Jan. 13, 2025, 8 pages (English Translation Provided).
Decision to Grant pursuant to Article 97(1) Received for European Application No. 20719884.7, mailed on Oct. 24, 2024, 02 pages.
Final office action mailed on Jan. 16, 2025, in U.S. Appl. No. 17/790,914, 15 pages.
Notice of grant Received for Chinese Application No. 202080093593.4, mailed on May 10, 2024, 4 pages.

Notice of Grant Received for Chinese Application No. 202080099087.6, mailed on Feb. 8, 2025, 9 pages (English Translation Provided).
Communication pursuant to Article 94(3) Received in European Patent Application No. 20743462.2, mailed on Dec. 10, 2024, 5 pages.
Non-Final Office Action mailed on Dec. 11, 2024, in U.S. Appl. No. 17/914,684, 10 pages.
Communication under Rule 71(3) EPC Received for European Application No. 20707880,9, mailed on Mar, 5, 2025, 08 pages.
Examination report Received for Indian Application No. 202247046431, mailed on Jun. 2, 2025, 7 pages.
Final Office Action mailed on Apr. 14, 2025, in U.S. Appl. No. 17/914,684, 11 pages.
Final Office Action mailed on Mar. 25, 2025, in U.S. Appl. No. 17/793,624,10 pages.
Notice of Allowance mailed on Apr. 29, 2025, in U.S. Appl. No. 17/790,914, 10 pages.
Second Office Action Received for Chinese Application No. 202080099092.7, mailed on May 16, 2025, 15 Pages (English Translation Provided).
U.S. Appl. No. 17/790,914, filed Jul. 5, 2022.
U.S. Appl. No. 17/793,624, filed Jul. 18, 2022.
U.S. Appl. No. 17/914,640, filed Sep. 26, 2022.
U.S. Appl. No. 17/914,684, filed Sep. 26, 2022.
Communication Under Rule 71(3) EPC, Received in European Patent Application No. 20743462.2, mailed on May 14, 2025, 08 pages.
Decision on Rejection Received for Chinese Application No. 202080099092.7, mailed on Sep. 8, 2025, 07 Pages (English Translation Provided).
Decision to grant a European patent pursuant to Article 97(1) EPC, Received in European Patent Application No. 20743462.2, mailed on Jul. 31, 2025, 03 pages.
Decision to Grant pursuant to Article 97(1) received in European Application No. 20707880.9, mailed on Jul. 3, 2025, 2 pages.
Non-Final Office Action mailed on Aug. 22, 2025, in U.S. Appl. No. 17/914,684, 10 Pages.
Non-Final Office Action mailed on Jul. 2, 2025, in U.S. Appl. No. 17/793,624, 14 pages.
Non-Final Office Action mailed on Jun. 26, 2025 in U.S. Appl. No. 17/914,640, 13 pages.
Notice of Allowance mailed on Aug. 26, 2025, in U.S. Appl. No. 17/790,914, 10 pages.

* cited by examiner

HINGE WITH TRANSLATABLE AXIS

CROSS-REFERENCE TO RELATED APPLICATIONS

This application claims priority to and the benefit of U.S. Provisional Patent Application No. 62/957,641, filed on Jan. 6, 2020, which is hereby incorporated by reference in its entirety.

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computer. Hybrid computers may act as a tablet computer or a laptop computer.

Some hybrid computers are clamshell devices that are used in different orientations. For example, some hybrid computers may be oriented with a touch-sensitive surface laid flat against the table or other surfaces on which the user is operating the hybrid computer. Some hybrid computers have a keyboard in a first body of the computer and a touch-sensitive display in a second body of the computer, where the first body and the second body are connected by a hinge.

Conventional hinges have a single pivot point, limiting the geometries at which the first body and second body may be positioned. The position of the pivot point determines the range of relative positions of the first body and second body. Hybrid computers can position a touch-sensitive display or human interface device in different orientations or positions to allow a greater variety of user experiences. A hinge with a pivot point that is translatable can provide an increased range of possible orientations or positions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a hinge system has a first body and a second body rotatably connected to one another around a first pivot point. The second body has a top surface and bottom surface positioned opposite one another in a vertical direction of the second body. A translation mechanism is connected to the second body and the first pivot point to displace the first pivot point in the vertical direction relative to the second body.

In some embodiments, a method of moving a hinge in an electronic device includes rotating a first body of the electronic device relative to a second body of the electronic device around a first pivot point, and translating the first pivot point in a vertical direction relative to the second body based upon the rotational position of the first body relative to the second body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 12-1 through 12-3 illustrate the motion of a hinge with a translatable axis while operating in a laptop posture according to at least one embodiment of the present disclosure;

FIGS. 13-1 through 13-3 illustrate the motion of the hinge of FIG. 12-1 while operating in a drafting posture, according to at least one embodiment of the present disclosure;

3

Figure 1:
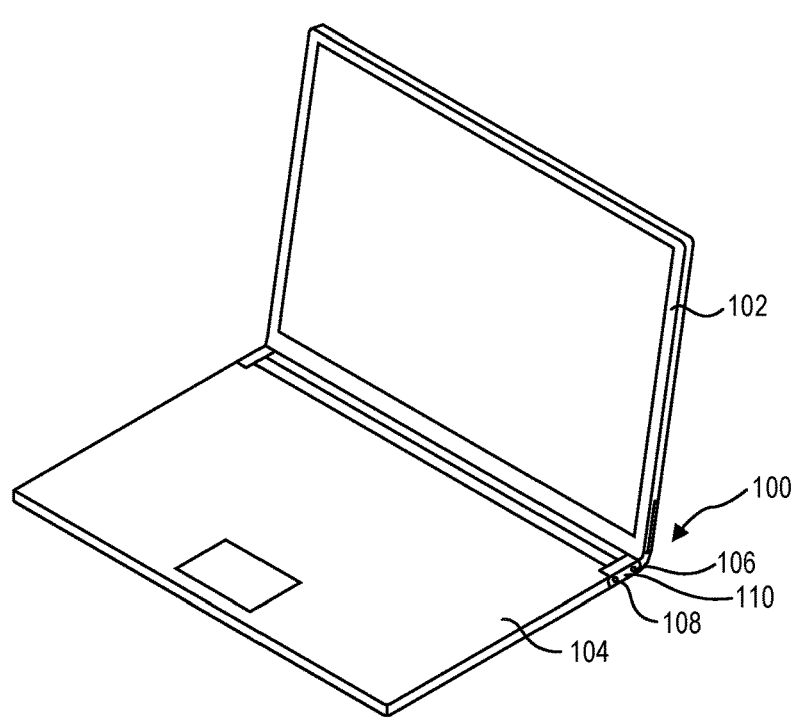
FIG. 1 is a perspective view of an electronic device with a hinge having a movable pivot point, according to at least one embodiment of the present disclosure.
Figure 2:
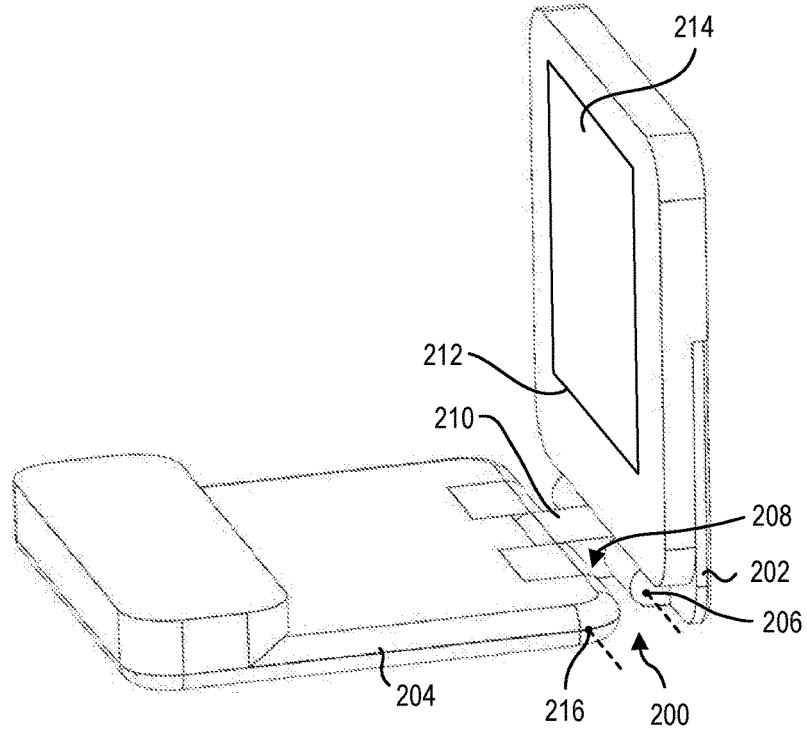
FIG. 2 is a perspective view of an electronic device with a translatable pivot point hinge, according to at least one embodiment of the present disclosure.
Figures 1, 14:
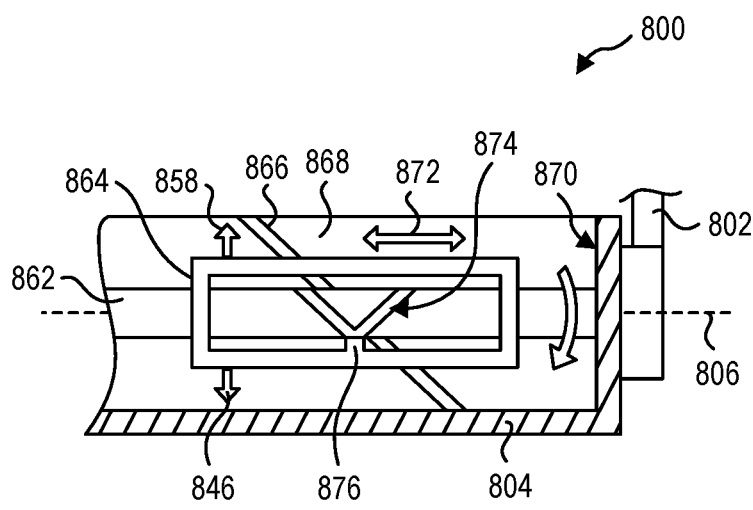
Figures 2, 14:
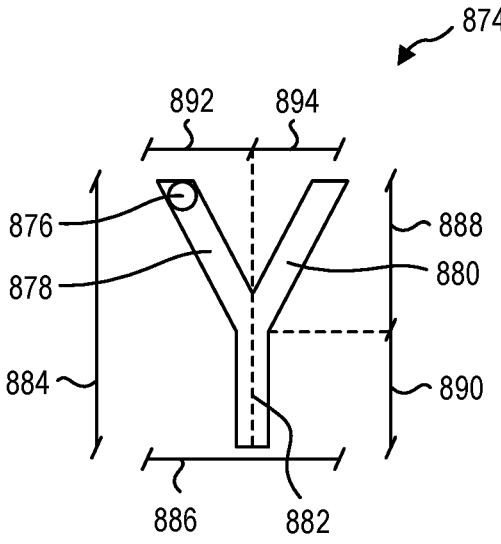
Figure 15:
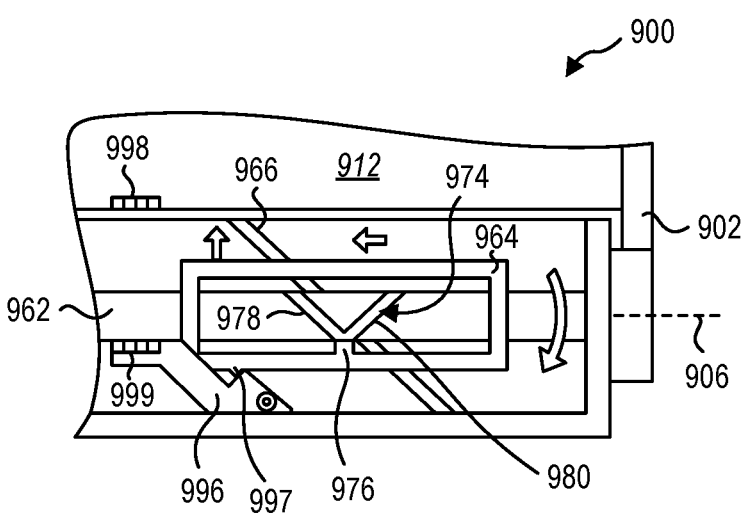
Figure 16:
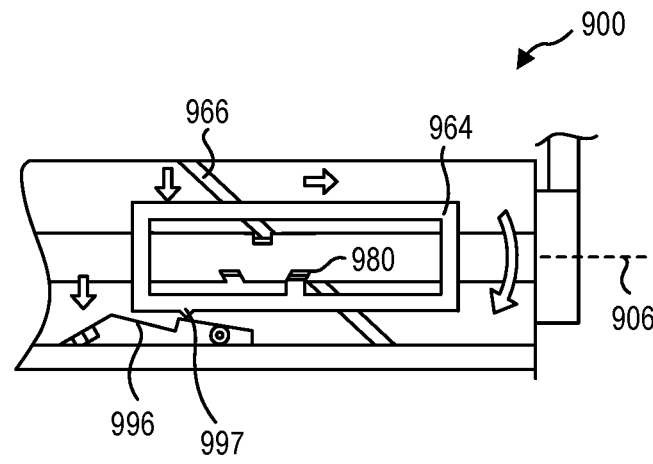

FIG. 14-1 is a front view of a hinge having a translatable carrier, according to at least one embodiment of the present disclosure;

FIG. 14-2 is a schematic plan view of a groove that moves the carrier of FIG. 14-1, according to at least one embodiment of the present disclosure;

FIG. 15 is a front view of the hinge of FIG. 14-1 with a directional lock engaged, according to at least one embodiment of the present disclosure; and FIG. 16 is a front view of the hinge of FIG. 15 with the directional lock disengaged, according to at least one embodiment of the present disclosure.

DETAILED DESCRIPTION

This disclosure generally relates to moving electronic devices between a variety of configurations. More particularly, this disclosure generally relates to a hinge and/electronic device having a hinge with a pivot point or axis that translatable transverse to the axis. The hinge connects a first body and a second body of a device and allows the first body and second body to pivot relative to one another. The first body and second body of the device are connected about the pivot point while the pivot point is translatable relative to one of the first body and second body.

A hinge for an electronic device has a translatable pivot point. The hinge may translate the pivot point in a direction transverse to the axis of rotation to move the axis of rotation relative to at least one of the first body and second body. For example, the hinge can displace the pivot point in a direction of a top surface of the first body. The movement of the pivot point relative to the first body displaces the second body relative to the first body.

By controlling the location of the pivot point, the location and relative position of a first side of the hinge and a second side of the hinge may be controlled. For example, a laptop having a translatable hinge can allow the first body and second body to nest within one another or otherwise reduce a height (i.e., thickness) of the device in a closed state. Reducing the height of the device can protect the device during transport or usage, render the device more stable by moving a center of mass lower in the device, or provide new and/or different user experiences, as will be described in more detail herein.

FIG. 1 is a perspective view of a hinge 100 that connects a first body 102 of an electronic device to a second body 104 of the electronic device. The hinge 100 includes a first pivot point 106 and translation mechanism 108. In some embodiments, the first pivot point 106 and the translation mechanism 108 of the hinge 100 are connected by a link 110. For example, the link 110 may be rotatably connected to the second body. As the link 110 rotates relative to the second body 104, the link 110 can move the first pivot point 106 relative to the second body 104. For example, as the link 110 rotates around a second pivot point of the translation mechanism 108 connected to the second body 104 (e.g., the base of the electronic device), the first pivot point 106 connected to the first body 102 (e.g., the display of the electronic device) displaces vertically relative to the second body 104.

In some embodiments, a hinge 100 may connect a first body 102 of an electronic device to a second body 104 of the electronic device. For example, the first body 102 may house a display, such as a touchscreen display while the second body 104 may house one or more computing components, such as a CPU, a GPU, one or more storage devices, one or more input devices, a power supply, or other computing components that may be configured to communicate with (e.g., receive information from, send information to, or send power to) the display in the first body 102.

The hinge 100 may allow the first body 102 and second body 104 to communicate data or electrical signals through the hinge 100. Translation of the first pivot point 106 of the hinge 100 can allow the first body 102 and second body reduce the likelihood of damage to the data or electrical conduits that provide the data or electrical communication across the hinge 100.

In some embodiments, the motion of the hinge 100 may change depending on the presence and/or position of the first body 102 or of another body relative to the hinge 100. For example, the display may be supported by and separable from the first body 102. In such embodiments, removing or moving the display of the electronic device changes the mode of the hinge 100, such that the hinge 100 closes and/or opens differently when the display is not connected to the first body 102.

In some embodiments, a hinge 100 behaves differently depending on a state of the first body 102. For example, the hinge 100 may have a different height when the first body 102 is connected to the hinge 100. In another example, the first pivot point 106 has a first height when a third body is connected to the first body 102 and a different second height with a third body is disconnected from or moved relative to the first body 102.

FIG. 2 illustrates an embodiment of another electronic device with a hinge 200 connected to a first body 202 and a second body 204. The first body 202 supports a third body 212. The first body 202 functions as a stand for the third body 212. In some embodiments, the first body 202 provides electrical and/or data communication between the second body 204 and the third body 212. In other embodiments, the first body 202 supports the third body 212 while the third body 212 and second body 204 communicate through a wireless data communication. For example, the third body 212 may include a processor in communication with a first wireless communication device, and the second body 204 may include a hardware storage device in communication with a second wireless communication device. The processor of the third body 212 may access the information stored on the hardware storage device of the second body 204 through the first and second wireless communication devices.

The first body 202 supports the third body 212 in the depicted "laptop configuration" with the link 210 in-line with the second body 204 and a display 214 oriented toward a user. When a user closes the hinge 200 in the laptop configuration, the first pivot point 206 rotates to the 90° orientation illustrated (between the first body 202 and the link 210), stops, and rotation about the second pivot point 216 raises the link 210 to a 90° configuration with the second body 204. The link 210 of the displacement mechanism 208 thus provides a vertical displacement 213 of the first body 202 relative to the second body 204 in a vertical direction to enter the clamshell configuration illustrated in FIG. 3.

In some embodiments, the third body 212 contacts the link 210 in the laptop configuration. The contact between the third body 212 and the link 210 provides a physical hardstop on the rotational range of motion of the first pivot point 206 and forces any further rotation to be around the second pivot point 216 of the displacement mechanism 208. In other embodiments, the presence of the third body 212 in the laptop configuration with the first body 202 actuates the displacement mechanism 208 in the hinge 200 to force any rotation to be around the second pivot point 216.

In some embodiments, the vertical displacement 213 of the displacement mechanism 208 is in a range having an upper value, a lower value, or upper and lower values including any of 5 millimeters (mm), 7.5 mm, 10 mm, 12.5 mm, 15 mm, 17.5 mm, 20 mm, 22.5 mm, 25 mm, 25.4 mm, 27.5 mm, 30 mm, 35 mm, 38.1 mm, or any values therebetween. For example, the vertical displacement 213 may be greater than 5 mm. In other examples, the vertical displacement 213 may be less than 38.1 mm. In yet other examples, the vertical displacement 213 may be between 5 mm and 38.1 mm. In further examples, the vertical displacement 213 may be between 10 mm and 20 mm. In at least one example, the vertical displacement 213 is about 12.7 mm.

Figure 3:
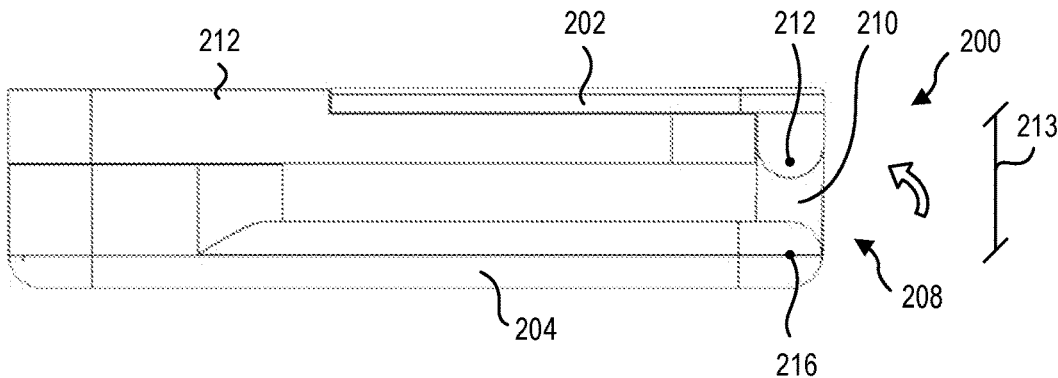
FIG. 3 is a side view of the electronic device of FIG. 2 in a clamshell configuration.
Figure 4:
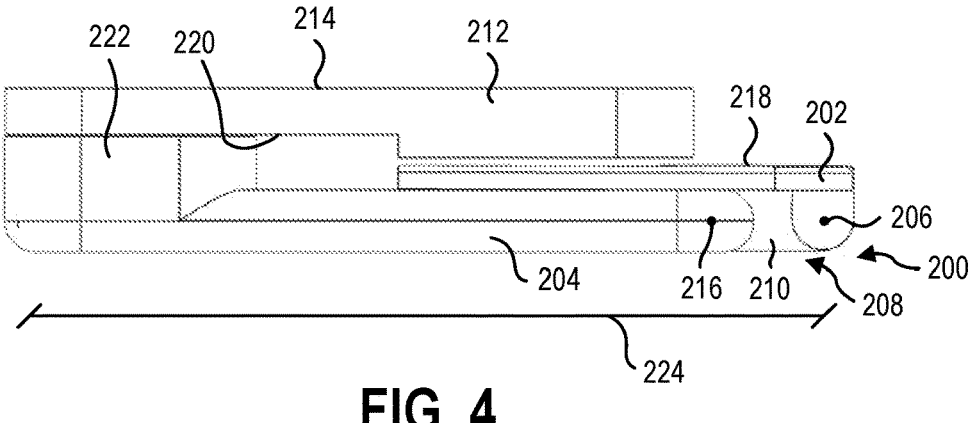
FIG. 4 is a side view of the electronic device of FIG. 2 in a nested configuration.

FIG. 4 is a side view of the electronic device of FIGS. 2 and 3 in a second closed configuration. The hinge 200 has a second stable closed configuration in a "nested configuration" of the hinge 200 where the link 210 remains in-line with (e.g., at a 180° orientation around the second pivot point 216 from) the second body 204. The link 210 being in-line with the second body 204 does not provide the vertical displacement described in relation to FIG. 3 in the clamshell configuration. In some embodiments, the nested configuration allows the first body 202 to nest against the second body 204, with a surface of the first body 202 sitting flush against a surface of the second body 204. In the nested configuration, the first pivot point 206 rotates to a 0° orientation (e.g., rotates and closes beyond the 90° orientation described in relation to FIG. 3) between the first body 202 and second body 204. In some embodiments, the third body 212 is repositioned on a back surface 218 of the first body 202, providing a nested configuration for the electronic device.

The first body 202 nests in the second body 204 with the third body 212 in contact with the back surface 218 of the first body 202 and with a palmrest 222 of the second body 204. In contrast to the clamshell configuration, the display 214 of the third body 212 is oriented away from the second body 204 and upward toward a user for viewing, when in the nested configuration.

While the displacement mechanism 208 of FIG. 2 through FIG. 4 can allow the first pivot point 206 to move in a vertical direction when closed, the rotation of the link 210 around the second pivot point 208 also moves the first pivot point 206 in a longitudinal direction. The displacement mechanism 208, therefore, changes a depth 224 of the electronic device while also moving the first pivot point 206 with a vertical displacement described in relation to FIG. 3.

Figure 5:
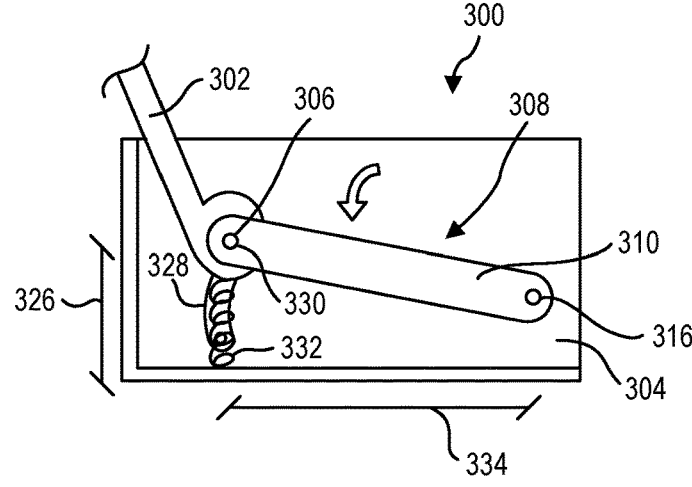
FIG. 5 is a side detail view of a hinge with a translatable axis, according to at least one embodiment of the present disclosure.
Figure 6:
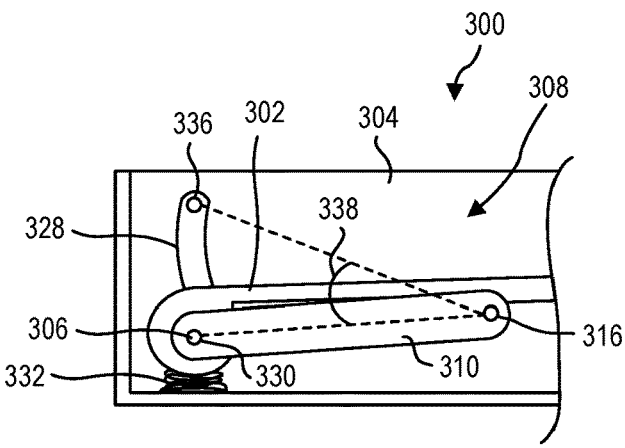
FIG. 6 is a side detail view of the hinge of FIG. 5 in a lower position, according to at least one embodiment of the present disclosure.

In other embodiments, a hinge 300 according to the present disclosure has vertically aligned upper and lower positions, as shown in FIG. 5 and FIG. 6. For example, FIG. 5 illustrates the hinge 300 in an upper position, supporting the first body 302 relative to the second body 304. The first pivot point 306 is positioned at a greater height 326 relative to second body 304 than in the lower position illustrated in FIG. 6.

Referring again to FIG. 5, the displacement mechanism 308 includes a link 310 that is rotatable about a second pivot point 316. A first pivot point 306 is positioned at an opposite end of the link 310 as is movable in a vertical direction relative to the second body 304. The link 310 is rotatable around the second pivot point 316 such that the first pivot point 306 is movable in an arcuate path. In some embodiments, a portion of the link 310 travels in a track 328. For example, the first pivot point 306 may have a pin 330 or axle that protrudes from the link 310 and engages with the track 328. The pin 330 can slide within the track 328 guiding the link 310 between the upper position and the lower position.

In some embodiments, the displacement mechanism 308 further includes a biasing element 332 positioned to bias the first pivot point 306 toward the upper position or lower position. For example, the embodiment illustrated in FIG. 5 includes a spring biasing element 332 that biases the link 310 or other portion of the displacement mechanism 308 toward the upper position. The biasing element 332 may support the link 310 and the first body 302 (and/or a third body) without additional support. In other examples, the pin 330 or axle may engage with the track 328 or the second body 304 to lock the displacement mechanism 308 in the upper position.

FIG. 6 is a side view of the hinge 300 in a lower position. The link 310 is rotated around the second pivot point 316 to move the first pivot point 306 downward in the vertical direction relative to the second body 304. Moving the first pivot point 306 downward moves the first body 302 downward.

As the link 310 rotates and the first pivot point 306 moves downward, the biasing element 332 is placed under compression. The biasing element 332 applies a counteracting force to a portion of the displacement mechanism 308 to urge the first body 302 and/or the link 310 toward the upper position. The displacement mechanism 308 can be held in the lower position against the force applied by the biasing element 332 by the pin 330 or other catch mechanism engaging with one or more holes 336 in the second body 304. In some examples, the track 328 includes a hole 336 at a top end that corresponds to the upper position and a hole 336 at the bottom end that corresponds to the lower position. In at least one example, the catch is a push catch that retains the link 310 in the lower position when pushed downward and releases the link 310 from the lower position when pushed again while in the lower position.

The link 310 or other portion of the displacement mechanism 308 rotates through an angle 338 around the second pivot point 316. In some embodiments, the angle 338 is in a range having an upper value, a lower value, or upper and lower values including any of 5°, 10°, 15°, 20°, 25°, 30°, 35°, 40°, 45°, or any values therebetween. For example, the angle 338 may be greater than 5°. In other examples, the angle 338 may be less than 45°. In yet other examples, the angle 338 may be between 5° and 45°. In further examples, the angle 338 may be between 10° and 30°. In at least one example, the angle 338 is about 20°.

Figure 7:
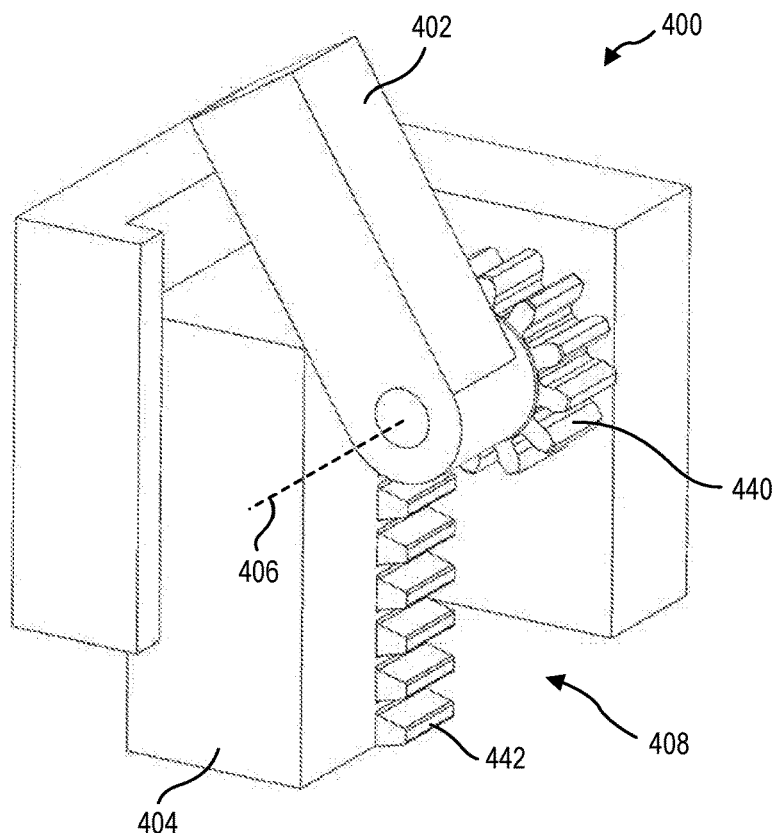
FIG. 7 is a perspective view of a hinge with a rack-and-pinion translatable axis, according to at least one embodiment of the present disclosure.

In some embodiments, the displacement of the pivot point of the hinge is linear. For example, FIG. 7 illustrates an embodiment of a hinge 400 having a displacement mechanism 408 including a pinion gear 440. In some embodiments, the pinion gear 440 is affixed to the pivot point 406, such that the first body 402 and the pinion gear 440 shared a rotational axis (i.e., is coaxial with the pivot point 406). In other embodiments, the pinion gear 440 has a parallel rotational axis to the pivot point 406, does not shared a rotational axis. The rotation of the pinion gear 440 displaces the pivot point 406 linearly along the rack 442 affixed to the second body.

In some embodiments, the pinion gear 440 is rotationally independent from the first body 402, allowing rotation of the pinion gear 440 (and associated linear displacement of the pivot point 406) to be independent of the rotation of the first body 402 relative to the second body 404.

Figure 8:
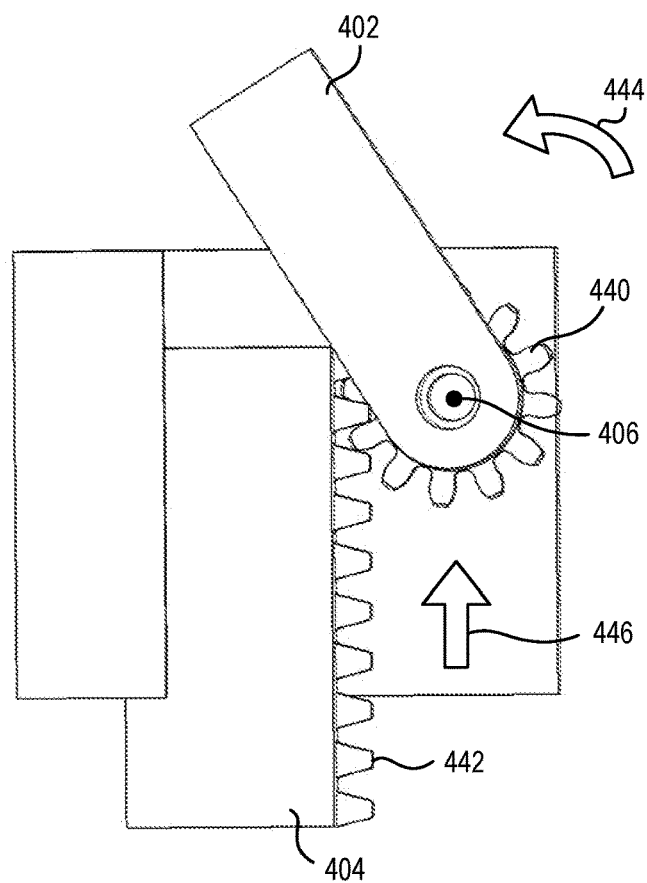
FIG. 8 is a side view of another hinge with a rack-and-pinion translatable axis, according to at least one embodiment of the present disclosure.

In other embodiments, the pinion gear 440 is rotationally fixed relative to the first body 402 around the pivot point 406. FIG. 8 is a side view of the hinge 400 of FIG. 7 with a rotationally fixed pinion gear 440. As the first body 402 rotates around the pivot point 406 of the hinge 400 in a first rotational direction 444 (e.g., towards an open laptop configuration), the pinion gear 440 engages with the rack 442 of the second body 404 to translate the pinion gear 440 and pivot point 406 linearly in a first vertical direction 446. Conversely, rotating the first body 402 around the pivot point 406 in a second rotational direction opposite the first rotational direction 444 toward a closed position translates the pivot point 406 in a second vertical direction opposite the first vertical direction 446.

Figure 9:
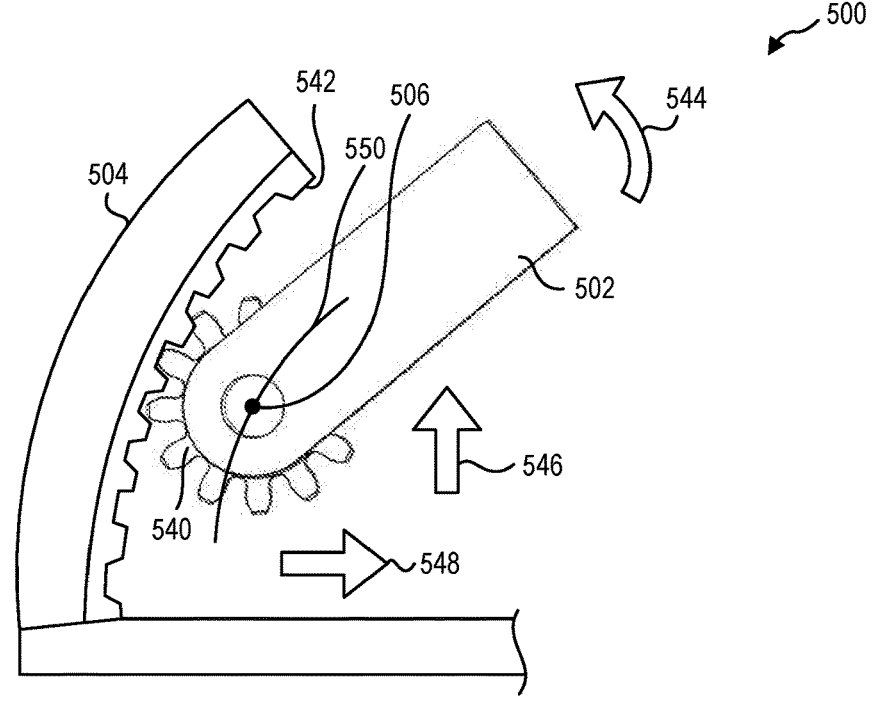
FIG. 9 is a side view of a hinge with a curved rack, according to at least one embodiment of the present disclosure.

FIG. 7 and FIG. 8 illustrate a hinge 400 with a linear (i.e., straight) rack 442. In some embodiments, the hinge has a non-linear rack or an angled rack oriented at a non-vertical direction. FIG. 9 is a side view of another embodiment of a hinge 500 with a displacement mechanism including a pinion gear 540 and non-linear rack 542, such as a segment of an annular gear. In embodiments with a pinion gear 540 rotationally fixed relative to the first body 502, rotation of the first body 502 around the pivot point 506 produces non-linear translation of the pivot point 506.

During rotation of the first body 502 in the first rotational direction 544, the pinion gear 540 engages with the non-linear rack 542 and applies a force to move the pivot point 506 in both a first vertical direction 546 and a first longitudinal direction 548. Conversely, rotating the first body 502 around the pivot point 506 in a second rotational direction opposite the first rotational direction 544 toward a closed position translates the pivot point 506 in a second vertical direction opposite the first vertical direction 546.

In some embodiments, a non-linear rack 542 allows a center of mass of the first body 502 to move in a first longitudinal direction 548 when moving the first body 502 toward an open position. As the pivot point 506 moves along a non-vertical path 550, the pivot point 506 moves in a first longitudinal direction 548 relative to the second body 504.

Figure 10:
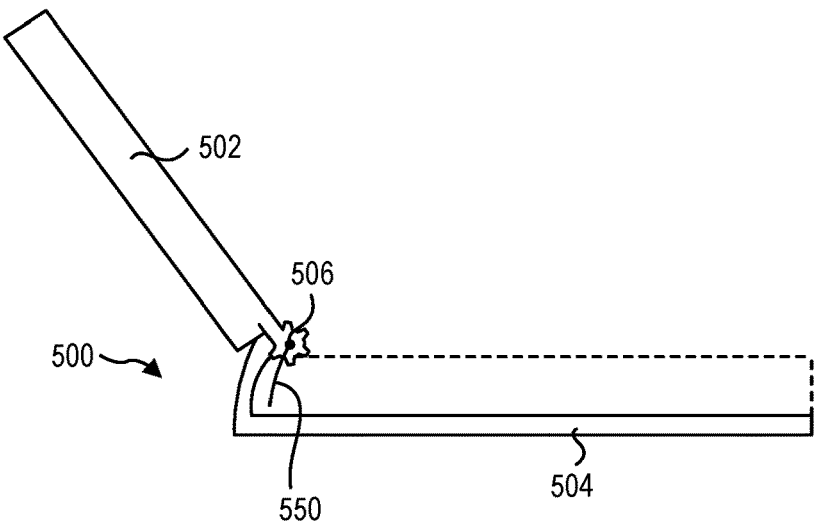
FIG. 10 is a side schematic view of an electronic device including a hinge with a curved rack, according to at least one embodiment of the present disclosure.

Referring now to FIG. 10, moving the pivot point 506 of the first body 502 in a longitudinal direction may move the center of mass of the first body 502 closer to the center of mass of the second body 504. For example, an electronic device having a touch-sensitive display (such as the display 214 illustrated in FIG. 2) supported by the first body 502 may be more stable when a user interacts with the touch-sensitive display when the first body 502 is positioned closer to the second body 504.

Conversely, when the first body 502 is rotated around the pivot point 506 in a second rotational direction opposite the first rotational direction, the pivot point 506 follows the path 550 vertically downward and longitudinal rearward. The first body 502 can thereby nest (illustrated in dashed lines) against the second body 504, which may provide additional protection and/or smaller dimensions for the electronic device during transport.

Figure 11:
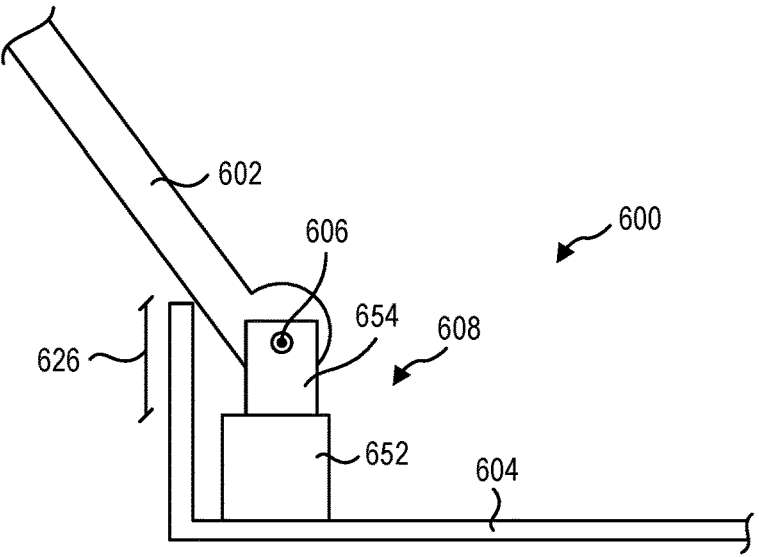
FIG. 11 is a side detail view of a hinge with an electronically translatable axis, according to at least one embodiment of the present disclosure.

FIG. 11 is a side view of an embodiment of a hinge 600 with an electronically translatable pivot point 606. In some embodiments, the hinge 600 includes an actuator 652 that moves a hinge support 654 in a vertical direction relative to the second body 604. The actuator 652 may, therefore, move the hinge axis 606 and the first body 602 a height 626 in the vertical direction. In some embodiments, the actuator 652 moves the hinge axis 606 and first body 602 a full height 626 in one motion when the first body 602 moves past a trigger point or position in the rotation around the hinge axis 606. For example, when the first body 602 is rotated at least 10° relative to second body 602 in an opening direction from the closed position, the actuator 652 may move the hinge axis 606 and the first body 602 through the full height 626 of the actuator 652 from a lowest position to a highest position.

In some embodiments, the actuator 652 moves the hinge axis 606 and first body 602 a portion of the full height 626 proportionally to the rotational position of the first body 602 around the hinge axis 606. For example, when the first body 602 is rotated 30° relative to second body 602 in an opening direction from the closed position, the actuator 652 may move the hinge axis 606 and the first body 602 to 25% of the full height 626 of the actuator 652 from a lowest position toward a highest position. When the first body 602 is rotated 60° relative to second body 602 in an opening direction from the closed position, the actuator 652 may move the hinge axis 606 and the first body 602 to 50% of the full height 626 of the actuator 652 from a lowest position toward a highest position. When the first body 602 is rotated 90° relative to second body 602 in an opening direction from the closed position, the actuator 652 may move the hinge axis 606 and the first body 602 to 75% of the full height 626 of the actuator 652 from a lowest position toward a highest position.

In some embodiments, a translatable hinge axis allows the electronic device to have a slimmer profile when closed in a clamshell position. In some embodiments, the translatable hinge axis allows a display cover of the electronic device to be better protected when closed in a clamshell position.

Figures 1, 12:
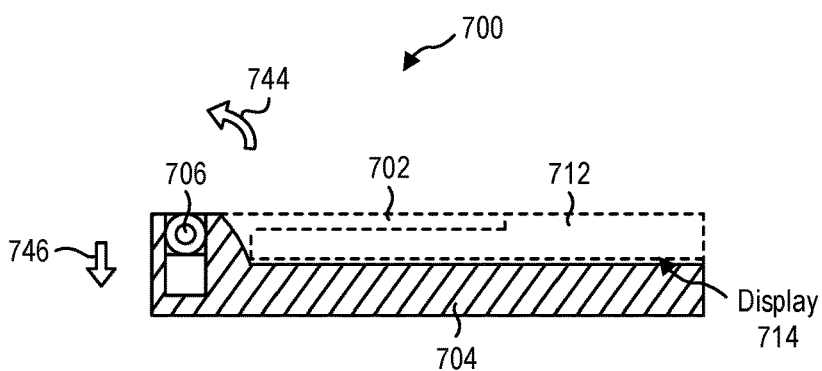
Figures 2, 12:
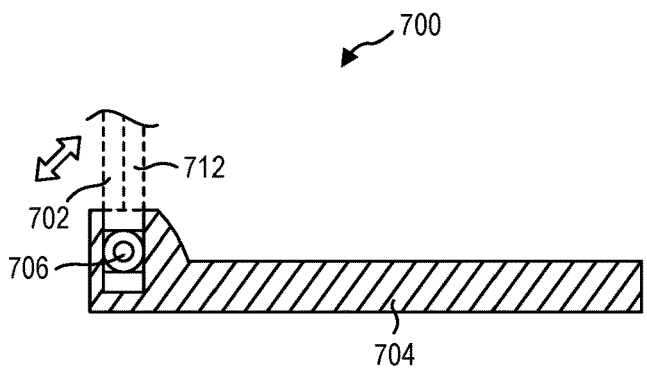
Figures 3, 12:
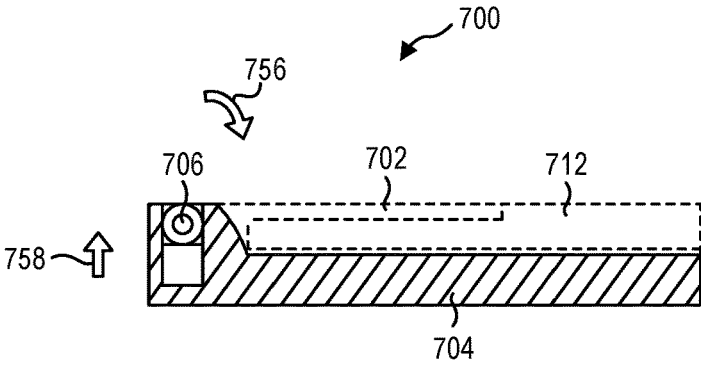

FIGS. 12-1 through 12-3 illustrate the range of motion of another embodiment of a hinge 700 with a translatable pivot point 706. In some embodiments, an electronic device has a pivot point 706 that translates in a vertical direction in relation to the rotation position of the first body 702 (e.g., support for a display cover) relative to the second body 704 (e.g., the base) when operating in a laptop posture. The electronic device is operating in the laptop posture when a third body 712 connected to the first body 702 is oriented with a display 714 or other inner surface facing the second body 704.

FIG. 12-1 is a side cross-sectional view of the hinge 700 with a translatable pivot point 706 in a clamshell configuration. The clamshell configuration positions the translatable pivot point 706 at a top end of the pivot point's travel. This supports the first body 702 above the second body 704 to provide clearance for at least part of the third body 712 between the first body 702 and the second body 704. The clamshell configuration is a closed position when the electronic device is being used in a conventional laptop posture.

In some embodiments, the hinge 700 converts movement in a first rotational direction 744 of the first body 702 around the pivot point 706 into a vertical translation in a first vertical direction 746 of the pivot point 706 through at least a portion of the rotational range of motion of the hinge 700. In some embodiments, the vertical translation of the pivot point 706 is related to the posture of the electronic device. In some embodiments, when the electronic device is used in the laptop posture (e.g., the first body 702 and third body 712 remain flush to one another and the support hinge between the first body 702 and third body 712 remains closed with the first body 702 and third body 712 held at a 0° angle relative to one another), the vertical translation of the pivot point 706 has a first range of motion, and, when the electronic device is used in a nested posture (e.g., the first body 702 and third body 712 are moved apart from one another and the support hinge opens to an angle greater than 0°), the vertical translation of the pivot point 706 has a second range of motion. In some embodiments, the vertical translation range of motion is greater in the nested posture than in the laptop posture.

Referring now to FIG. 12-2, the rotational motion of the first body 702 around the pivot point 702 in a first rotational direction also produces a vertical translation in the position of the pivot point 706. For example, opening the cover of the electronic device (e.g., the first body 702 and attached third body 712) causes the pivot point 706 to translate downward toward the second body 704. As shown in FIG. 12-3, in some embodiments, rotating the cover of the electronic device in a second rotational direction 756 opposite to the first (e.g., to close the cover) causes an associated opposite vertical motion in a second vertical direction 758, raising the pivot point 706 upward relative to the second body 704. Rotating the cover in the second direction to close the cover restores the pivot point 706 to the original vertical location shown in FIG. 12-1.

Figures 1, 13:
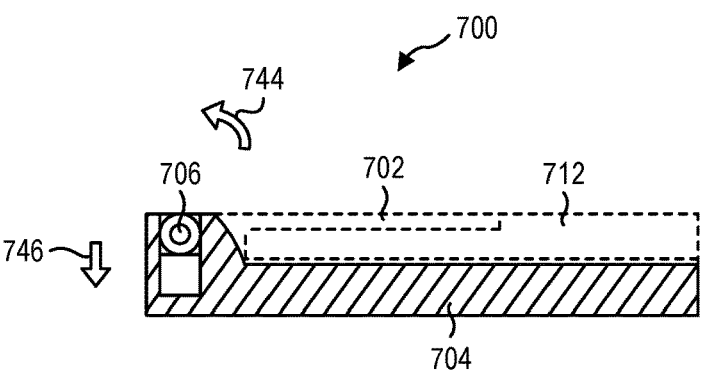
Figures 2, 13:
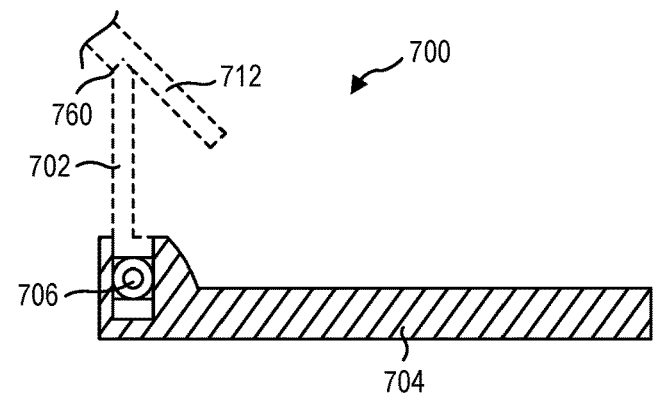
Figures 3, 13:
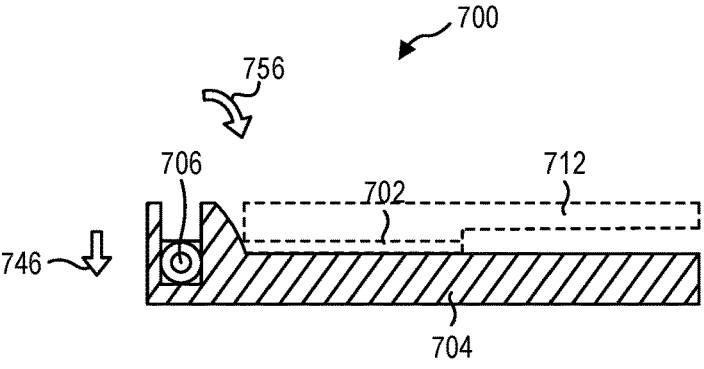

Some embodiments of a hinge according to the present disclosure have a second range of motion when the electronic device is operated in a nested posture. Referring now to FIGS. 13-1 through 13-3, the hinge 700 may translate the pivot point 706 downward relative to the second body 704 when the hinge 700 is closed but the support hinge is open (e.g., not closed at a 0° angle between the first body 702 and third body 712 and the bottom edge of the third body is swung away from the first body 702).

FIG. 13-1 is a side view of the electronic device of FIG. 12-1. The electronic device exhibits the same vertical translation of the pivot point in the first vertical direction 746 toward the second body 704 when the cover including the first body 702 and third body 712 is rotated in the first rotational direction 744. As the cover opens, the pivot point 706 lowers through a first portion of the rotational range of motion of the hinge 700. After the first portion of the rotational range of motion of the hinge 700, a user opens the support hinge 760 to rotate the third body 712 relative to the first body 702 and move the electronic device to a nested posture as shown in FIG. 13-2. In some embodiments, when the support hinge 760 is open, the hinge behavior changes and/or reverses.

Referring now to FIG. 13-3, in some embodiments, rotation of the first body 702 around the pivot point 706 in the second rotational direction 756 (i.e., closing the hinge 700 with the first body 702 rotating toward the second body 704) while in the nested posture causes the pivot point 706 to translate further downward in the first vertical direction 746 relative to the second body 704. In some embodiments, the pivot point translates upward relative to the second body when the third body is rotated in the first direction (rotated toward the position shown in FIG. 13-2). When the support hinge is closed, the first body and third body may be rotated in the second direction to close the cover to the clamshell configuration and further translate the pivot point upward to the original position shown in FIG. 13-1.

FIGS. 14-1 and 14-2 illustrate an embodiment of a hinge 800 that exhibits the dual mode behavior described in relation to FIGS. 12-1 through 13-3. In some embodiments, the hinge 800 includes an axle 862 that is positioned within and rotatable within a carrier 864. The carrier 864 is engaged with an angled guide 866 on the frame 868 of the hinge 800. In some embodiments, the frame 868 of the hinge 800 is part of the housing of the electronic device. In some embodiments, the frame 868 of the hinge 800 is connected to the housing of the electronic device. In some embodiments, the frame 868 of the hinge 800 is part of the second body 804.

The frame 868 has slots 870 that allow the axle 862 to translate in either the first vertical direction 846 or the second vertical direction 858 relative to the frame 868 based on the vertical position of the carrier 864. The angled guide 866 on the frame 868 of the hinge 800 urges the carrier 864 vertically up and down relative to the frame 868 when the carrier 864 moves left and right in a horizontal direction 872 relative to the frame 868. It should be understood that descriptions of directions are relative to the perspective and orientation of the hinge. In some embodiments, the angled guide 866 is a rail or other protrusion from the frame 868 that engages with a notch or other recess in the carrier 864. In some embodiments, the angled guide 866 is a groove or other recess in the frame 868 that engages with a rail or other protrusion from the carrier 864.

The horizontal position of the carrier 864 is related to the rotational position of the axle 862 (and therefore the rotational position of the first body 802). In some embodiments, the position of the axle 862 and carrier 864 are related to one another by a groove 874 in the axle 862 and a pin 876 protruding from the carrier 864 and positioned in the groove 874. In some embodiments, the location of the groove 874 and the pin 876 are reversed with a pin 876 protruding from a surface of the axle 872 and positioned in a groove 874 on an inner surface of the carrier 864. Rotation of the axle 862 relative to the carrier 864 (and frame 868) around the pivot point 806 causes the groove 874 and pin 876 to interact and urge the carrier 864 horizontally relative to the frame 868. As described herein, horizontal movement of the carrier 864 is converted into vertical movement of the carrier 864 by the angled guide 866 between the frame 868 and the carrier 864. The vertical movement of the carrier 864 moves the axle 862 vertically relative to the frame 868. In this way, rotation of the axle 862 around the pivot point 806 moves the pivot point 806 vertically relative to the frame 868.

Referring now to FIG. 14-2, the groove 874 includes, in some embodiments, at least two channels that provide the dual mode behavior of the hinge. The first channel 878 corresponds to the hinge motion in the laptop posture, and the second channel 880 corresponds to the hinge motion in the nested posture. In some embodiments, the groove 874 has a shared channel 882 that allows consistent behavior irrespective of the posture in that portion of the rotation range of motion.

FIG. 14-2 is a flat plan view of the groove 874 positioned in the surface of the axle. The groove 874 has a height 884 (in a rotational direction around the axle) and a width 886 (in a longitudinal direction of the axle). The rotational position of the axle is related to the position of the pin along the height 884 of the groove 874. For example, as the axle rotates in the first direction, the pin 876 moves down the height 884 of the groove 874. The horizontal position of the carrier (e.g., along a longitudinal direction of the axle) is related to the position of the pin 876 along the width 886 of the groove 874. For example, as the pin 876 moves to the right on the groove 874, the carrier moves downward relative to the frame, due to the angled guide.

In some embodiments, in the clamshell position, the pin 876 is positioned a top-left position in the groove 874. Opening the hinge rotates the axle and moves the pin 876 downward in the first channel 878 of the groove 874 toward a junction with the second channel 880. In some embodiments, the first channel 878 and second channel 880 of the groove 874 have a split channel height 888 that is related to a first rotational range of motion of the hinge before the user can change postures of the electronic device. (FIG. 13-2 illustrates the first body 802 positioned at least at 90° before the hinge behavior changes in the nested posture.) In some embodiments, the split channel height 888 correlates to first rotational range of motion in a range having an upper value, a lower value, or upper and lower values including any of 60°, 70°, 80°, 90°, 100°, 110°, 120°, or any values therebetween. In some embodiments, the first rotational range of motion is greater than 60°. In some embodiments, the first rotational range of motion is less than 120°. In some embodiments, the first rotational range of motion is about 90°.

The shared channel 882 is shown as having no longitudinal dimension throughout the shared channel height 890. The pin 876 moves through the shared channel height 882 as the axle rotates through a second rotational range of motion. Therefore, the pin 876 will not translate horizontally in the shared channel 882, in the illustrated embodiment. Without horizontal translation, the carrier does not move when the pin 876 is riding in the shared channel 882, and the pivot point does not translate while the hinge rotates within the second rotational range of motion.

As the axle rotates in the second rotational direction (e.g., closing the hinge of the electronic device), the pin 876 moves upward through the height 884 of the groove 874. When the hinge is in a rotational position in the shared channel 882, closing the hinge moves the pin 876 upward through the shared channel 882 toward the junction with the first channel 878 and second channel 880. When the pin 876 enters into and follows the first channel 878, moving the pin 876 upward and to the left through the split channel height 880 moves the carrier upward (due to the angled guide) and returns the first body to the clamshell position.

Conversely, when the pin 876 enters into and follows the second channel 880, moving the pin 876 upward and to the right through the split channel height 888 moves the carrier downward (due to the angled guide) and moves the first body to the tablet position. In some embodiments, the hinge has a mechanism that selectively urges the pin 876 toward the first channel 878 and/or the second channel 880, as will be described in relation to FIG. 15 and FIG. 16.

FIG. 14-2 illustrates an embodiment of a groove 874 with symmetrical and linear channels 878, 880, 882. In some embodiments, the channels 878, 880, 882 are longitudinally symmetrical. Symmetrical first and second channels 878, 880 of the split channel portion of the groove 874 mean that the rate of horizontal translation of the carrier due to rotation of the axle is constant. In some embodiments, the channels 878, 880, 882 are asymmetrical with the first channel and second channel 878, 880 having different slopes. Asymmetrical first and second channels 878, 880 of the split channel portion of the groove 874 produce a rate of horizontal translation of the carrier due to rotation of the axle that is different for the laptop posture and the nested posture.

In some embodiments, the channels 878, 880, 882 are linear. Symmetrical first and second channels 878, 880 of the split channel portion of the groove 874 mean that the rate of horizontal translation of the carrier due to rotation of the axle is constant. In some embodiments, the channels 878, 880, 882 are asymmetrical with the first channel and second channel 878, 880 having different slopes. Asymmetrical first and second channels 878, 880 of the split channel portion of the groove 874 produce a rate of horizontal translation of the carrier due to rotation of the axle that is different for the laptop posture and the nested posture.

In some embodiments, the angled guide is linear, as shown in FIG. 14-1 through FIG. 16. In some embodiments, the angled guide is non-linear or curved, resulting in different rates of vertical translation of the carrier as the carrier most horizontally along the angled guide at a constant horizontal rate. In some embodiments, a portion of the angled guide is linear, and a portion of the angled guide is curved.

In some embodiments, the channels 878, 880, 882 of groove are linear relative to the rotation of the axle, as shown in FIGS. 14-1 through FIG. 16. In some embodiments, at least one of the channels 878, 880, 882 has a non-linear or curved portion, resulting in different rates of horizontal translation of the carrier as the axle rotates relative to the carrier at a constant rotational rate. In some embodiments, a portion of at least one channels 878, 880, 882 of the groove 874 is linear, and another portion of the at least one channel 878, 880, 882 of the groove 874 is curved.

By altering the linearity and the height and width of the channels 878, 880, 882, the horizontal movement of the carrier can be adjusted to provide the desired rate of horizontal movement of the carrier in different rotational positions of the hinge. Similarly, by altering the linearity and the height and length of the angled guide 866, the vertical movement of the carrier can be adjusted to provide the desired rate of vertical movement of the carrier in different rotational positions of the hinge. Taken together, altering the size and shape of the groove 874 and the angled guide 866 can adjust the rate of vertical translation of the pivot point in different rotational positions of the hinge 800.

FIG. 15 illustrates another embodiment of a hinge 900 having a carrier 964 and angled guide 966. In some embodiments, the hinge 900 includes a lock mechanism 996 that engages with a protrusion 997 of the carrier 964 to limit horizontal movement of the carrier 964. In some embodiments, the lock mechanism 996 limits or prevents the pin 976 of the carrier 964 entering the second channel 980 of the groove 976. Therefore, the lock mechanism 996 prevents the pivot point 906 of the hinge 900 translating below the intermediate vertical position dictated by the shared channel. For example, when the lock mechanism 996 is engaged, the hinge 900 operates as described in relation to FIGS. 12-1 through 12-3. As the axle 962 rotates relative to the carrier 964, the pin 976 of the carrier 974 tracks between the first channel 978 and the shared channel.

In some embodiments, the lock mechanism 996 is held in the engaged position shown in FIG. 15 by a first magnet 998 affixed to the third body 912. The first magnet 998 applies a magnetic attraction force to a second magnet 999 or magnetic material on the lock mechanism 996. The magnetic attraction force will maintain the lock mechanism 996 in the engaged position until the third body 912 is rotated relative to the first body 902 and away from the hinge 900 to enter a nested posture, as described in relation to FIGS. 13-1 through 13-3. In some embodiments, the lock mechanism 996 experiences a magnetic force from another magnet, such as a selectively activated electromagnetic in the hinge 900.

In some embodiments, the lock mechanism 996 is moved and/or engaged by an electronic actuator. For example, the lock mechanism 996 may be moved between and engaged position and a disengaged position by an actuator that rotates the lock mechanism 996 away from the protrusion 997 of the carrier 964, as shown in FIG. 16, and/or a linear actuator that translates the lock mechanism 996 away from the protrusion 997 of the carrier 964.

In some embodiments, the lock mechanism 996 is moved and/or engaged by a cam mechanism in contact with the lock mechanism 996. In some embodiments, the cam mechanism is associated with and/or driven by rotation of the first body around the support hinge of the electronic device. For example, rotation of the third body relative to the first body around the support hinge may move a wire or belt in the third body that connects an axle of the support hinge to a cam contacting the lock mechanism 996. The cam may contact and apply a force to the lock mechanism 996 to rotate and/or translate the lock mechanism 996 away from the protrusion 997 of the carrier 964.

FIG. 16 illustrates the embodiment of the hinge 900 described in relation to FIG. 15 with the third body moved away from the hinge 900 and the lock mechanism 996 disengaged. In some embodiments, with the lock mechanism 996 disengaged and moved away from the protrusion 997 in the carrier 964, the carrier 964 is free to horizontally move to the right and vertically downward along the angled guide 966 in response to the pin 976 tracking in the second channel 980. Therefore, with the lock mechanism 996 disengaged, the pivot point 906 of the hinge 900 is free to move further downward vertically.

In at least some embodiments, a hinge system for providing vertical translation of a pivot point are described according to the following sections:

1. A hinge system for electronic devices, the hinge system comprising:
   a first body;
   a second body rotatably connected to the first body around a first pivot point, the second body having a top surface and bottom surface positioned opposite one another in a vertical direction of the second body; and
   a translation mechanism connected to the second body and the first pivot point, the translation mechanism displacing the first pivot point in the vertical direction relative to the second body.

2. The hinge system of section 1, the translation mechanism including a link connected to a second pivot point and the first pivot point, the link rotatable about the second pivot to displace the first pivot point in the vertical direction relative to the second body.

3. The hinge system of section 1, the translation mechanism including a pinion gear that translates the first pivot point when the pinion gear rotates relative to the second body.

4. The hinge system of section 3, wherein the pinion gear is rotationally fixed to the first body.

5. The hinge system of section 3, the translation mechanism including a rack.

6. The hinge system of section 3, the translation mechanism including an annular gear.

7. The hinge system of section 1, the translation mechanism including a movable carrier that supports an axle positioned therein.

8. The hinge system of section 1, the translation mechanism including a biasing element that biases the first pivot point in the vertical direction toward the top surface of the second body.

9. The hinge system of section 8, the translation mechanism having an upper position and a lower position, the translation mechanism further including a catch that holds the first pivot point in the lower position against the biasing element.

10. The hinge system of sections 8 or 9, further comprising a linear actuator connected to the second body and having a range of motion at least partially in the vertical direction.

11. The hinge system of any of sections 8-10, the biasing element being a spring.

12. The hinge system of any preceding section, the first body having a clamshell position and a nested position, wherein the translation mechanism positions the first pivot point at a lowest position in the vertical direction when the first body is in the nested position and at a highest position in the vertical direction when the first body in the clamshell position.

13. A method of moving a hinge in an electronic device, the method comprising:
   rotating a first body of the electronic device relative to a second body of the electronic device around a first pivot point; and
   translating the first pivot point in a vertical direction relative to the second body based upon the rotational position of the first body relative to the second body.

14. The method of section 13, wherein translating the first pivot point in a vertical direction includes moving the first pivot point in a linear path.

15. The method of section 13, wherein translating the first pivot point in a vertical direction includes moving the first pivot point in an arcuate path around a second pivot point.

16. The method of any of sections 13-15, wherein translating the first pivot point in a vertical direction includes displacing the first pivot point in a longitudinal direction.

17. The method of any of sections 13-16, wherein translating the first pivot point includes translating the first pivot point a full height of the translation when the rotational position of the first body relative to the second body exceeds a trigger point.

18. The method of any of sections 13-16, wherein translating the first pivot point includes translating the first pivot point a portion of a full height based on an amount of rotational of the first body relative to the second body exceeds a trigger point.

19. An electronic device comprising:
   a first body;
   a second body rotatably connected to the first body around a first pivot point, the second body having a top surface and bottom surface positioned opposite one another in a vertical direction of the second body;
   a third body rotatably connected to the first body; and
   a translation mechanism connected to the second body and the first pivot point, the translation mechanism displacing the first pivot point in the vertical direction between an upper position and a lower position relative to the second body,
   wherein the upper position allows the third body and second body to attain a clamshell position and the lower position allows the third body and second body to attain a nested position.

20. The electronic device of section 19, wherein the translation mechanism includes a moveable carrier that supports an axle, which defines the pivot point.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A hinge system for electronic devices, the hinge system comprising: a first body; a second body rotatably connected to the first body around a first pivot point, the second body having a top surface and bottom surface positioned opposite one another in a vertical direction of the second body; a third body supported by the first body; and a translation mechanism including a link, the link connected to the first body and the second body and configured to be horizontally in-line with the second body when the first body and the third body are perpendicular to the second body, and wherein the link is configured to be perpendicular to the second body when the first body and the third body are parallel with the second body in a clamshell position and the link is configured to be parallel to the second body when the first body and the third body are parallel with the second body in a nested position, and wherein the translation mechanism positions the first pivot point at a first position in the vertical direction when the first body is in the nested position and at a second position in the vertical direction when the first body is in the clamshell position, wherein, and the first position and second position are different.

2. The hinge system of claim 1, the translation mechanism including the link connected to a second pivot point and the first pivot point, the link rotatable about the second pivot point to displace the first pivot point in the vertical direction relative to the second body.

3. The hinge system of claim 2, wherein a contact between the third body and the link provides a physical hardstop on a rotational range of motion of the first pivot point.

4. The hinge system of claim 3, wherein the physical hardstop on the rotational range of motion of the first pivot point forces any further rotation to be around the second pivot point.

5. The hinge system of claim 1, wherein the translation mechanism positions the first pivot point at a lowest position in the vertical direction when the first body is in the nested position and at a highest position in the vertical direction when the first body in the clamshell position.

6. An electronic device comprising:
the hinge system of claim 1;
the third body rotatably connected to the first body; and
wherein the translation mechanism displaces the first pivot point in the vertical direction between an upper position and a lower position relative to the second body,
wherein the upper position allows the third body and second body to attain the clamshell position and the lower position allows the third body and second body to attain the nested position.

7. The hinge system of claim 1, wherein the first body functions as a stand for the third body.

8. The hinge system of claim 1, wherein the first body provides electrical communication between the second body and the third body.

9. A method of moving a hinge in an electronic device, the method comprising: rotating a first body of the electronic device around a first pivot point connected to a second body of the electronic device via a link from a closed position to an open position and wherein the link translates from a vertical position to a horizontal position, the second body having a top surface and bottom surface positioned opposite one another in the vertical direction, a third body supported by the first body, wherein the link is configured to be horizontally in-line with the second body when the first body and the third body are perpendicular to the second body, and wherein the link is configured to be perpendicular to the second body when the first body and the third body are parallel with the second body in a clamshell position and the link is configured to be parallel to the second body when the first body and the third body are parallel with the second body in a nested position, and wherein the translation mechanism positions the first pivot point at a first position in the vertical direction when the first body is in the nested position and at a second position in the vertical direction when the first body is in the clamshell position, wherein, and the first position and second position are different; and rotating the first body of the electronic device from the open position to the closed position wherein the link translates from the horizontal position to the vertical position.

10. The method of claim 9, wherein the link includes a first pivot point and a second pivot point and rotating the first body of the electronic device relative to the second body of the electronic device includes translating the first pivot point in an arcuate path around the second pivot point.

* * * * *